United States Patent [19]

Boyer

[11] Patent Number: 4,823,109
[45] Date of Patent: Apr. 18, 1989

[54] WARNING LIGHT SYSTEM

[76] Inventor: Frank S. Boyer, 32229 Olney Ct., Union City, Calif. 94587

[21] Appl. No.: 181,481

[22] Filed: Apr. 14, 1988

[51] Int. Cl.⁴ ............................................. B60Q 1/26
[52] U.S. Cl. ................................. 340/467; 340/479; 340/527; 340/309.15
[58] Field of Search ............ 340/74, 71, 72, 527, 340/66, 69, 309.15–309.5; 188/1.11; 200/61.89, 61.9

[56] References Cited

U.S. PATENT DOCUMENTS

| | | |
|---|---|---|
| 1,614,427 | 1/1927 | Friedland . |
| 2,312,300 | 2/1943 | Baerwald . |
| 2,552,665 | 5/1951 | Cirone ................... 200/59 |
| 2,833,880 | 5/1958 | Repkow ................. 200/83 |
| 2,945,209 | 7/1960 | Berg ....................... 340/71 |
| 3,214,732 | 10/1965 | Young ..................... 340/71 |
| 3,448,434 | 6/1969 | Nolte Jr. et al. ........ 340/71 |
| 3,564,532 | 2/1971 | Noriyoshi Ando . |
| 3,601,796 | 8/1971 | Mortimer ................ 340/71 |
| 3,639,898 | 2/1972 | Booth ..................... 340/71 |
| 3,806,870 | 4/1974 | Kalajian .................. 340/71 |
| 3,911,394 | 10/1975 | Shames .................. 340/71 |
| 4,083,032 | 4/1978 | Nakamura et al. .... 340/71 |
| 4,097,842 | 6/1978 | Zalar et al. ............. 340/71 |
| 4,149,141 | 4/1979 | Tanimura ................ 340/66 |
| 4,158,833 | 6/1979 | Chicoine ................. 340/72 |
| 4,219,710 | 8/1980 | Booth ..................... 200/81 |
| 4,275,378 | 6/1981 | Henderson ............. 340/71 |

Primary Examiner—Donnie L. Crosland
Attorney, Agent, or Firm—Joseph H. Smith

[57] ABSTRACT

A warning light system is provided for a vehicle powered by an engine employing an engine brake. The warning system takes a signal from an electrical control line associated with the engine brake and uses the signal to initiate a time delay. After the time delay, a switch is activated, turning on a warning light to warn drivers of other vehicles of the deceleration of the vehicle equipped with the warning light system.

11 Claims, 3 Drawing Sheets

WARNING LIGHT SYSTEM

BACKGROUND OF THE INVENTION

The present invention is in the field of warning lighting systems for vehicles, and relates more particularly to the activation of one or more warning lights for vehicles in order to alert drivers of following vehicles that the vehicle equipped with the warning lights may be slowing or stopping.

It is quite well known that warning lights at the rear of vehicles, such as automobiles and trucks that are driven on public roads and highways, are essential to alert drivers of other vehicles sharing the same roadways to impending changes in speed and position. Red tail lights are normally used during nighttime hours so that other drivers will see the lighted vehicle; direction signals, also called turn signals, are used to warn other drivers of impending lane change or cornering; stop lights are used, most usually activated by a switch in conjunction with a brake pedal, to warn other drivers that the brakes are being applied.

It is well known, too, that on the public highways many accidents happen because one driver may follow another at a distance that is too close for the following driver to react in time to apply his brakes after he becomes aware, by whatever means, that a vehicle he is following is slowing or stopping. It is also true that accidents happen because one driver may suddenly apply his brakes in the belief that a vehicle ahead is slowing or stopping, when in fact the leading vehicle is not slowing at all, which also might cause a collision. In all states rear warning lights, including stop warning lights, are required by law.

Virtually all wheeled vehicles used on public roads and highways have brakes of some description, such as drum or disk brakes, that act at or on the wheels of the vehicles to bring them to a stop when required. Brakes of this kind typically operate by urging a stationary element against a rotating element, converting the kinetic energy of motion of the vehicle to heat energy through the agency of friction. In virtually all cases, activation of the brakes associated with the wheels of the vehicles, usually by a foot pedal, but in some cases by a hand operated lever or other actuator, causes one or more rear mounted warning lights to light; and when the activating device is released, the lights are turned off.

There are braking systems in use on vehicles operated on public roads and highways other than friction braking devices acting at or on the wheels of the vehicles. Diesel powered tractor-trailer systems, for example, employ devices known as engine brakes, a particular type for example more colloquially known as Jacob's brakes, to slow the tractor-trailer system under varying circumstances. These engine brakes are initiated in various ways, a common method being by an actuator that sends an electrical signal to the engine brake at the engine at an appropriate time. As an example, releasing the accelerator while the transmission is engaged and the engine brake is enabled actuates the signal to engage the engine brake.

Activating the wheel braking system on such vehicles always causes the rear-mounted stop lights to light, and this relationship is required by law to warn following drivers of the immediately impending decceleration of the braking vehicle. Activation of the engine braking system, however, does not light the rear-mounted stop lights, or any other warning light or lights to alert a following driver. This ommission has been the cause of numerous rear-end collisions on the public highways.

The usual combination of events that causes an engine braking system to engage, letting off the accelerator while the transmission is still engaged for example, is a combination that might occur numerous times without perceptible decceleration of a tractor-trailer system, for instance when the driver changes gears. If the stoplights were activated at each such occurance, following drivers would get erroneous information and might well apply their own brakes and precipitate a dangerous situation. An argument may also be made that allowing the engine braking signal to activate the same warning lights as the wheel brakes would always supply eroneous information, because they are, after all, two different systems causing different deceleration conditions.

SUMMARY OF THE INVENTION

A warning light system is provided for a vehicle powered by an engine employing an engine brake. The warning system takes a signal from an electrical control line associated with the engine brake and utilizes the signal to initiate a time delay. After the time delay an electrically operated switch operates at least one warning light to warn drivers of other vehicles of the deceleration of the vehicle equipped with the warning light system. In one embodiment the delay device is a time delay relay. In another embodiment the delay device is an electrical circuit having a resistor and capacitor, with the delay time being associated with the RC time constant of the combination. In yet a third embodiment the delay device is an electrical circuit employing integrated circuits among other electrical elements, with the delay time formed by counting pulses from a clock. Additionally, a method is provided for operating such a warning light system.

DESCRIPTION OF THE PREFERRED EMBODIMENTS

Figure 1:
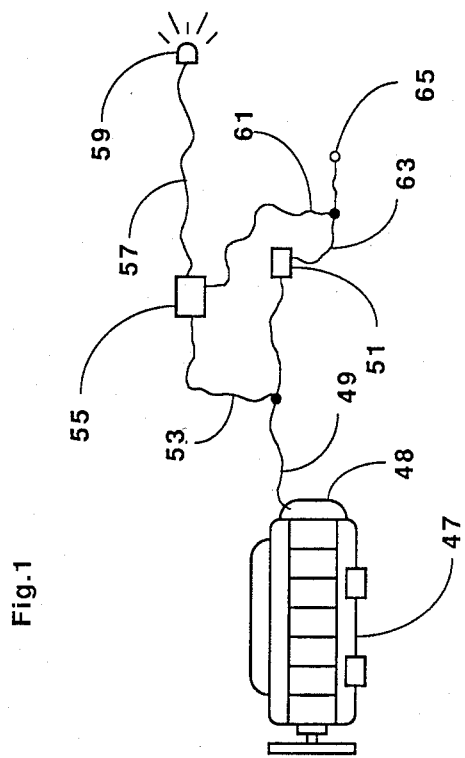
FIG. 1 is a diagram of the arrangement of elements of the invention.

FIG. 1 is a diagram showing a general layout of connected elements according to a preferred embodiment of the invention. An engine 47, such as a diesel engine that might be employed to power a vehicle on the public highways, such as a truck pulling a trailer, has an engine brake 48 attached that acts, when activated, to cause the engine to absorb energy from the drive train rather than to deliver energy to the drive train. Typically, to accomplish thi, the fuel flow is shut off to the engine, and the engine is operated as a compressor. Engine brake 48 is activated and caused to operate at an appropriate time by an electrical signal on control line 49, which signal is initiated by an activator 51. Activator 51 is typically located in the driver's compartment of the vehicle, and may be, for example, a microswitch associated with the accelerator pedal for the vehicle, causing the signal to be sent on line 49 when the driver releases the accelerator pedal.

A novel electrical circuit 55 is connected to control line 49 by an electrical line 53, so that the electrical signal sent to activate the engine brake will also activate electrical circuit 55. A terminal 65 is connected to the electrical system of the vehicle (not shown) for electrical energy, and is connected by electrical line 63 to activator 51 and through electrical line 61 to circuit 55.

Electrical circuit 55, which may be mounted at any convenient location on the vehicle or a trailer towed by such vehicle, when activated by a signal on line 53 from line 49 that controls the engagement of the engine brake, imposes a time delay which is a function of the elements and the connection of elements of the circuit, then closes a mechanical or a solid-state switch between power line 61 form the vehicle electrical system, and an electrical line 57. Line 57 leads to one or more warning lights mounted at the rear of the vehicle and/or a trailer towed by the vehicle. Typically, the warning light or lights have a ground connection to the vehicle which connection completes the electrical circuit back to the electrical system of the vehicle. This ground connection is not shown in FIG. 1. The warning light or lights are thus lighted after a time delay, warning any following driver of the impending deceleration of th vehicle equipped wih the invention. Also, if the activating signal on line 53 is interrupted, for example when the accelerator is pushed, the time delay system and warning lights are turned off. Hence, if the warning lights are on when the signal on line 53 is interrupted, deactivation of the delay system turns the lights off. Similarly, if the warning lights are off when the deactivation occurs, for example if the signal is interrupted in a time shorter than the delay time, the warning lights are not turned on at all.

The warning light or lights are typically mounted on the vehicle or towed trailer facing to the rearward, to be easily seen by a following driver. The time delayis typically about one to two seconds, although longer or shorter delays might be imposed. The use of a delay is to leave the warning lights unlit during procedures that might otherwise activate the lights but not result in significant deceleration, such as, for example, shifting through the range of gears that are typical of many trucks used on the public highways. Hence, as a practical matter, the delay should typically be long enough to permit shifting of gears without activating the light, so that in general the time delay should be at least a few tenths of a second at the minimum, and in everyday operation should probably have a lower bound of about one-half of a second for a normal manual shifting arrangement. If the warning light or lights were to be lit instantly at each time the combination of conditions causing activation of the engine brake were to occur, following drivers might well be confused and apply their own brakes unnecessarily, causing a dangerous situation.

There are number of ways that a time delay may be instituted following a signal, and then provide a connection to the warning light or lights after the delay. Devices called time delay relays which are operable at the D.C. voltage common for vehicle electrical systems are commercially available, and the function of electrical circuit 55 in one embodiment can be provided by one of these devices. These delay relay devices, however are relatively expensive compared to some other circuitry that can be used.

Figure 2:
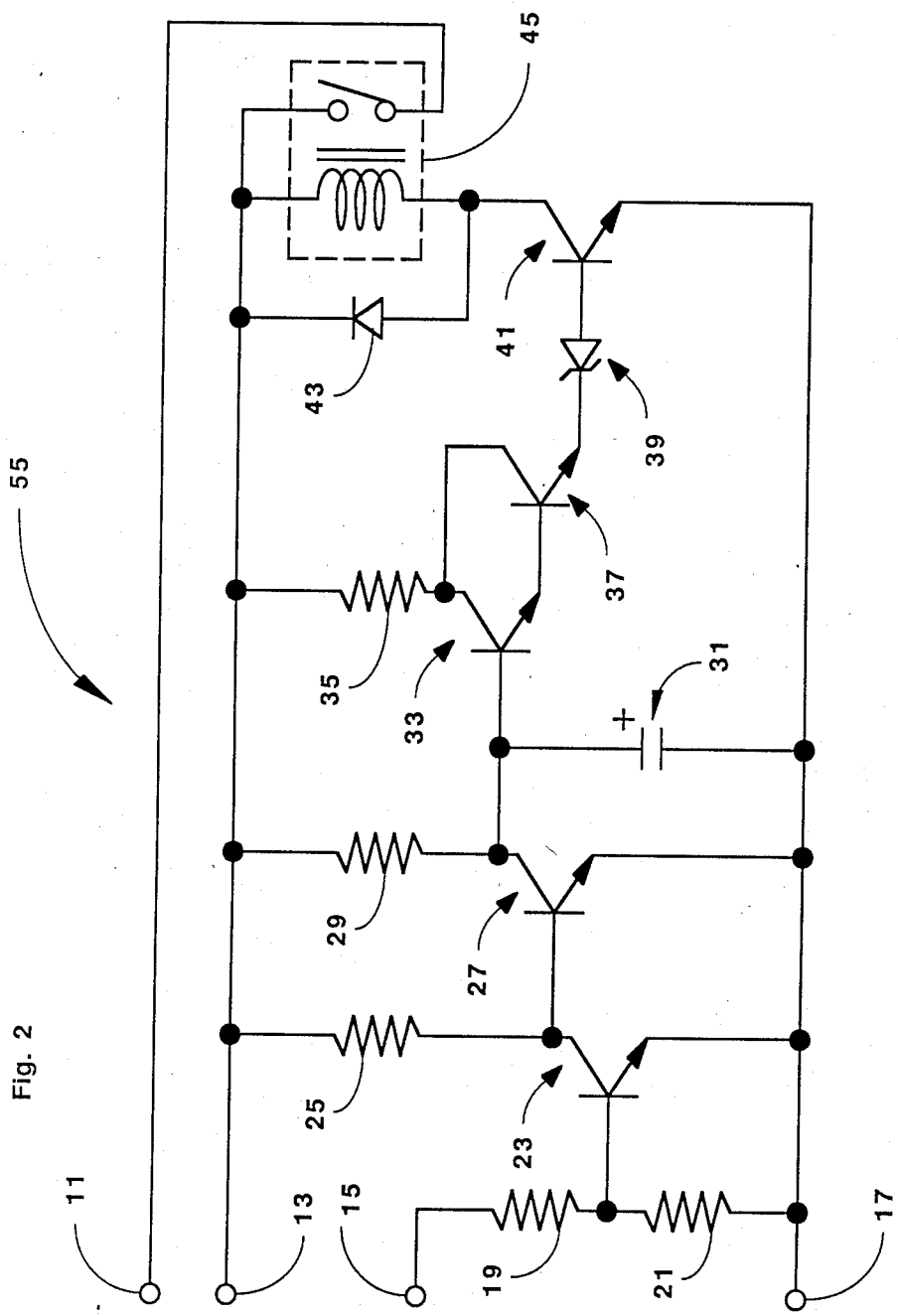
FIG. 2 is a wiring diagram showing elements and connection of elements for an electrical delay circuit according to the invention.

FIG. 2 is a wiring diagram illustrating elements and connections between elements that together provide another preferred electrical circuit 55. The circuit of FIG. 2 is accomplished with transistors, resistors, diodes, a capacitor, ad a solenoid switch. The elements of the circuit may be mounted on a common base as a printed circuit board (PCB) for production purposes-, and packaged in a suitable housing for mounting on a vehice with the terminals accessible for wiring to the necessary points in the vehicle wiring system.

In FIG. 2 terminal 15 is wired to accept the initiating control signal which arrives on wire 53 of FIG. 1. Terminal 13 is connected to the vehicle electrical system via line 61 of FIG. 1, and provides the D.C. power for operating the circuit elements and lighting the warning light or lights. Terminal 11 is connected to line 57 of FIG. 1, which is the line that is connected to the warning light or lights. Terminal 17 is connected to the vehicle ground reference (not shown in FIG. 1).

The circuit shown by FIG. 2 is designed to work with the widely used 12 Volt electrical system of most vehicles. For vehicles with other electrical standards, the values of elements can be changed to suit. To activate the circuit, a signal at terminal 15 must be from +7.7 Volts to about +12 Volts. A voltage at terminal 15 of less than 7.7 Volts is disabling to the circuit.

Resistor 19 has a typical value of 200K ohms and resistor 21 has a typical value of 20K ohms. Resistors 19 and 21 shunt the control signal for gaining noise immunity. Element 23 is a switching transistor and resistor 25 has a value of 200K ohms. Element 27 is another switching transistor and resistor 29 at 200K ohm and capacitor 31 at 10 microfarads form a time delay equal to two seconds, which is the product of the resistance and the capacitance by a formula well known in electrical engineering. The time delay can be changed by substituting elements of different values into the circuit. Transistors 33 and 37 are wired to form a curret amplifier with current supplied through resistor 35 at 200K ohms. The amplified current is sufficient to turn Zener diode 39 and transistor 41 on, which draws a sufficient current through the coil of solenoid operated switch 45 to close the switch. Transistor 43 is for transient protection.

The switch of solenoid operated switch 45 will close at a time after an enabling signal arrives at terminal 15 equal to the delay imposed by resistor 29 and capacitor 31. When the switch closes, terminals 11 and 13 are connected, providing power to the warning light or lights. When the signal at terminal 15 falls below 7.7 Volts, the switch of solenoid operated switch 45 will open, and the warning light or lights will be turned off. A exemplary component for transistors 23, 27, 33, 37, and 41, is a 2N3904. Similarly an exemplary device for Zener diode 39 is a 1N5232, and an exemplary dode 43 is a 1N4001.

Figure 3:
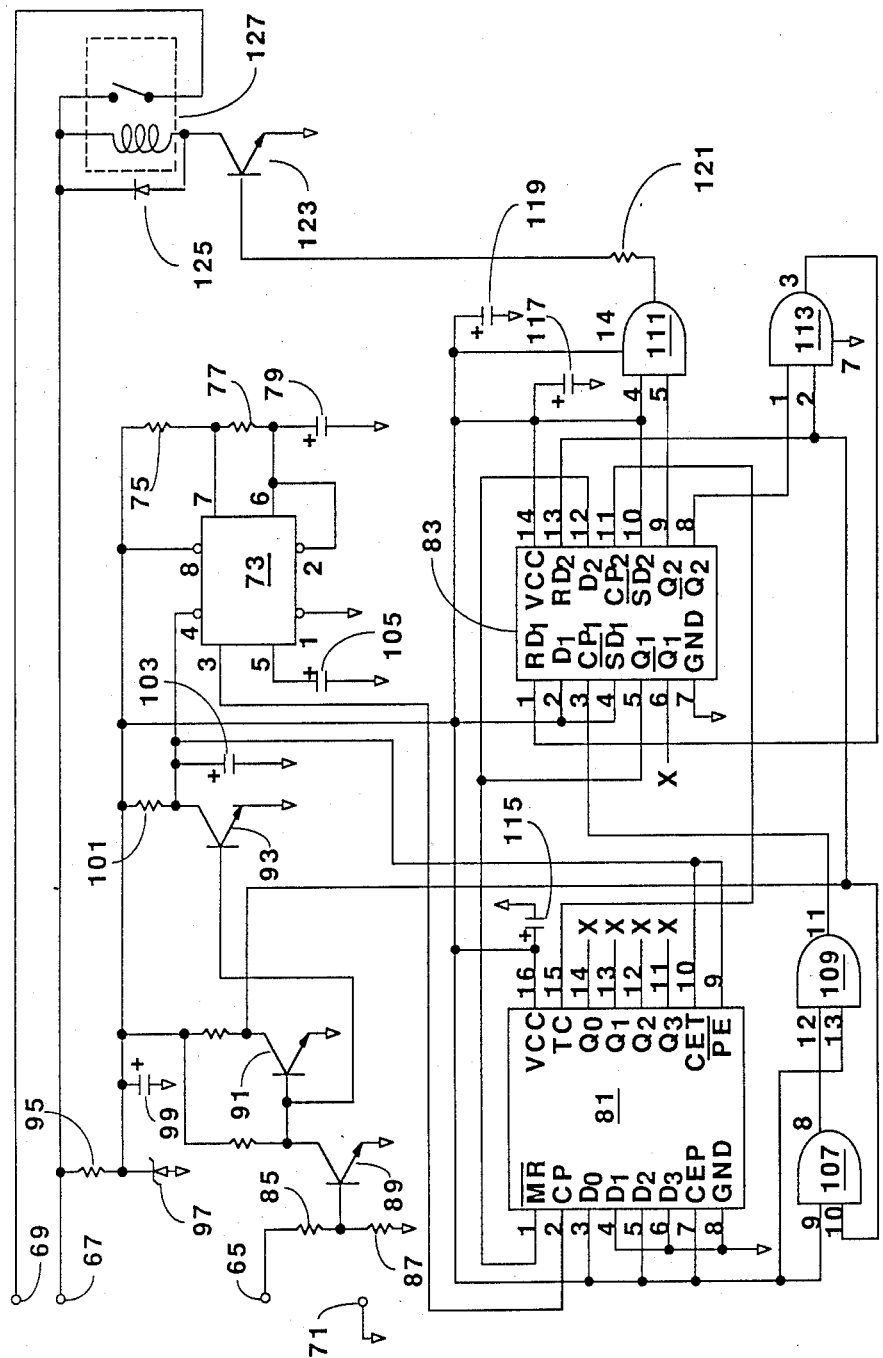
FIG. 3 is a wiring diagram showing elements and connection of elements for an alternative electrical delay circuit according to the invention.

An alternative preferred embodiment for electrical circuit 55 is shown by wiring diagram FIG. 3. The circuit of FIG. 3 is based primarily on integrated circuits. In FIG. 3, terminal 65 is the control terminal, terminal 67 is the power terminal from the vehicle electrical system, and terminal 69 is the terminal wired to the warning light or lights. Terminal 71 is connected to the vehicle ground reference. Element 73 is a clock generator IC (for example such as a 555 timer) for which the clock time is a function of the values of resistors 75 and 77 and the value of capacitor 79 in farads. In this alternative embodiment as examples of the preferred values, resistor 75 is 100K ohms, resistor 77 is 51K ohms, and capacitor 72 is 1 microfarad. Element 81 is a counter IC (for example such as a 74LS163) and element 83 is a state machine controller IC (for example such as a 74LS74). The counter and the clock generator determine the delay time.

In FIG. 3 resistor 85 has an exemplary value of 200K ohms and resistor 87 has an exemplary value of 20K ohms. Similarly, all other values for compoents listed are meant to be exemplary in nature. Element 89, 91, and 93 are switching transistors. Resistor 95 has a value of 150 ohms, rated at one-half watt, element 97 is a Zener diode, and capacitor 99 has a value of 1 microfarad. Resistor 101 at 10K ohm and capacitor 103 at 0.1 microfarad form a time delay of 1 milisecond for loading the clock generator. Capacitor 105 has a value of 0.01 microfarad. ICs 107, 109, 111, and 113 form clock delays. Capacitors 115, 117, and 119 each have a value of 0.1 microfarad. Resistor 121 has a value of 4.7K ohms.

Element 123 is another switching transistor, element 125 is a diode for transient suppression, and element 127 is a solenoid operated switch as used in the first described preferred embodiment. When an enabling signal appears at terminal 65, the circuit of FIG. 3 is activated, and transistor 123 is switched on after the designed delay time. When transistor 123 is on, current through the coil of solenoid operated switch 127 closes the switch of the solenoid operated switch, and terminals 67 and 69 are connected, supplying power to the warning light or lights. When the enabling signal is removed, transistor 123 is switched off, current ceases to flow through the coil of solenoid operated switch 127, and the warning light or lights are turned off. Exemplary elements for the switching transistors 89, 91, 93, and 123 are 2N3904's, for the diode 125 is a 1N4001, for clock delays 107, 109, 111, and 113 are 74LS08's, and for Zener diode 97 is a 1N751.

It will be apparent to those skilled in the art that there are many changes that can be made in detail without departing from the spirit and scope of the invention. For example, both of the time delay circuits described can be rendered with elements of different values and wired in different ways while performing substantially the same result, which is to provide a known and predesigned delay time between an enabling signal and actually turning on one or more warning lights in response to engagement of an engine braking system on a vehicle. As another example, there are numerous suitable ways in which such circuits may be packaged, and numerous suitable places on a vehicle where such circits may be mounted, all without departing from the spirit and scope of the invention.

What is claimed is:

1. A warning light system having at least one warning light for a vehicle powered by an engine having an engine brake, said engine brake being activated by a first signal on a control line, comprising:
   delay means having a first terminal and a second terminal, said first terminal coupled to said control line, said delay means for supplying electrical power at said second terminal in response to said first signal after a preselected time delay;
   a warning light for warning drivers of other vehicles of activation of said engien brake;
   electrical connection means for connecting said second terminal of said delay means to said warning light so that electrical power is supplied to said warning light when electrical power is supplied to said second terminal.

2. A warning light system as in claim 1 wherein said delay means comprises deactivation means for turning off said warning light when said first signal on said control iline is interrupted, and for preventing said warning light from coming on if said first signal is interrupted before said preselected time delay has passed.

3. A warning light system as in claim 1 wherein said preselected time delay is at least one-half second in duration.

4. A warning light system as in claim 1 wherein said preselected time delay is in the range of one to two seconds.

5. A warning light system as in claim 1 wherein said delay means comprises a capacitor and a resistor coupled to produce a second signal after said preselected time delay in response to said first signal, the preselected time delay being related to the resistance of the resistor times the capacitance of the capacitor.

6. A warning light system as in claim 5 wherein said delay means comprises switching means coupled to receive said second signal, said switching means for providing said electrical power to said second terminal in response to said second signal.

7. A warning light system for a vehicle as in claim 1 wherein said delay means comprises a time delay relay.

8. A warning light system as in claim 1 wherein said delay means comprises:
   clock means for generating a sequence of clock pulses in response to said first signal;
   counter means for counting said clock pulses, and for providing a second signal after a preselected number of pulses have been counted, said preselected number of pulses corresponding to said preselected time delay; and
   switch means coupled to receive said second signal, for providing said electrical power to said second terminal in response to said second signal.

9. A method of operating a warning light for a vehicle powered by an engine employing an engine brake, comprising the steps of:
   receiving a signal associated with the activation of said engine brake;
   waiting a preselected delay time after receiving said signal; and
   activating a switching element after said delay time, said switching element for turning on said warning light.

10. The emethod of claim 9 further comprising turning off the warning light when said signal is interrupted.

11. The method of claim 9 further comprising inhibiting activation of said switching element if said signal is interrupted before said delay time has passed.

* * * * *